United States Patent
Okamura et al.

(10) Patent No.: US 7,545,313 B2
(45) Date of Patent: Jun. 9, 2009

(54) OFF-AXIS ANGLE ESTIMATION METHOD AND APPARATUS USING THE SAME

(75) Inventors: Atsushi Okamura, Tokyo (JP); Rokuzou Hara, Tokyo (JP); Toshio Wakayama, Tokyo (JP); Toshiyuki Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 11/632,926

(22) PCT Filed: Nov. 12, 2004

(86) PCT No.: PCT/JP2004/016871

§ 371 (c)(1),
(2), (4) Date: Jan. 19, 2007

(87) PCT Pub. No.: WO2006/051603

PCT Pub. Date: May 18, 2006

(65) Prior Publication Data

US 2008/0012752 A1    Jan. 17, 2008

(51) Int. Cl.
*G01S 7/40*    (2006.01)
*G01S 13/93*    (2006.01)
(52) U.S. Cl. .................... 342/173; 342/174; 342/70
(58) Field of Classification Search ............ 342/62–65, 342/70–72, 173–174
See application file for complete search history.

(56) References Cited

U.S. PATENT DOCUMENTS 6,246,949 B1 *   6/2001   Shirai et al. ............... 701/96

FOREIGN PATENT DOCUMENTS

GB    2 334 842    1/1999

(Continued)

*Primary Examiner*—Thomas H Tarcza
*Assistant Examiner*—Cassi Galt
(74) *Attorney, Agent, or Firm*—Birch, Stewart, Kolasch & Birch, LLP

(57) ABSTRACT

Without using a traveling velocity of a vehicular object mounted with a radar device, an off-axis angle which is an offset angle between a reference direction of the radar device and a traveling direction of the vehicular object is estimated.

An off-axis angle estimation method for estimating an off-axis angle ($\phi$) of a radar device (1) mounted on the vehicular object having a predetermined traveling direction includes that, from among reflection points of which a relative-velocity component (q) along the line of radar sight and an azimuthal angle ($\theta$) are detected by the radar device (1), a plurality of reflection points of which the relative-velocity components in the traveling direction of the vehicular object being approximately equal to one another is selected without using the traveling velocity of the vehicular object; and based on the relative-velocity components along the line of radar sight, and on the azimuthal angles, of the plurality of reflection points having been selected, the off-axis angle ($\phi$) is autonomously calculated solely from the observed values based on radar waves.

5 Claims, 4 Drawing Sheets

FOREIGN PATENT DOCUMENTS

| | | |
|---|---|---|
| JP | 9-236659 | 9/1997 |
| JP | 10-132939 | 5/1998 |
| JP | 11-94943 | 4/1999 |
| JP | 2000-98026 | 4/2000 |
| JP | 3331882 | 7/2002 |
| JP | 2002-228749 | 8/2002 |
| JP | 3414267 | 4/2003 |
| JP | 2003-519387 | 6/2003 |
| JP | 2003-531383 | 10/2003 |
| JP | 2004-198159 | 7/2004 |

* cited by examiner

OFF-AXIS ANGLE ESTIMATION METHOD AND APPARATUS USING THE SAME

TECHNICAL FIELD

The present invention relates to error estimation technologies of an offset angle (an "off-axis angle," "alignment offset angle") to a reference direction of a radar utilizing reflections of propagating waves such as radio waves, sound waves, and light waves, in particular, to an estimation technology of the offset between a reference axis of the radar used for detecting radar reflectors in a frontal direction of a vehicular object (a traveling direction of the vehicular object), and the frontal direction of the vehicular object.

BACKGROUND ART

Recently, by mounting radar devices on vehicular objects such as motor vehicles, and by detecting radar reflectors such as obstacles in traveling directions, developments are carried out so as to realize those functions for velocity controls and collision prevention. In these radar devices, because a radar reference axis becomes misaligned off an originally presumed direction, a problem can be raised in that an azimuthal angle with respect to a radar reflector obtained as a result of processed radar signals becomes not correct.

These kinds of offsets of the reference axis are caused by poor accuracy of an initial work done when a radar device is mounted on a vehicular object. Moreover, even if at an initial stage the radar device is mounted on the vehicular object with high accuracy, there exist cases in which the reference axis becomes misaligned with actual use. Because, correctly observed values can not be obtained from the radar device under a state in which the reference axis becomes misaligned, contribution to increased safety can not be made.

As a consequence, such technologies are proposed as to adjust the reference axis of a radar device mounted on a vehicular object to a traveling direction of the vehicular object (for example, in Patent Document 1). These are proposed for estimating a direction of the reference axis by using velocity information on a vehicular object mounted with a radar and observed values of reflection points, which are primarily stationary objects.

(Patent Document 1)
Japanese Patent Laid-Open No. 2002-228749, "On-Vehicle Millimeter-Wave Radar Device"

DISCLOSURE OF THE INVENTION (Problems to be Solved by the Invention)

In conventional off-axis angle estimation technologies, in order to estimate the off-axis angle, it is necessary to obtain a traveling velocity of the vehicular object mounted with a radar device. For this reason, velocity information obtained from a self-velocity sensor for the vehicular object must be taken by some methods into an off-axis angle estimation device, therefore, wiring work has been required to obtain the velocity information when the radar device is mounted. Moreover, in cases of a vehicular object that has no interface to supply to a radar device velocity information for use, this kind of off-axis angle estimation technology can not have been even, in the first place, applied.

In this case, it can be considered that an off-axis angle estimation device and a radar device are configured to autonomously seek, by some methods, a velocity of the vehicular object. However, off-axis angles are in most cases very small, and very accurate and highly stable velocity sensors applicable to estimating these very small off-axis angles are expensive. In addition, those velocity sensors are heavy in weight and bulky in volume. For these reasons, it becomes difficult to allocate an installation space for the on-vehicle radar. This becomes a stumbling block to widespread use of radar devices having off-axis angle estimation functions with a built-in self-velocity sensor, and consequently leads to a result of retarding traffic safety.

(Means of Solving the Problems)

In order to solve these problems, in one aspect of this invention, an off-axis angle estimation method for estimating an off-axis angle of a radar device mounted on a vehicular object, with there being reflection points whose relative-velocity components along the line of radar sight and whose azimuthal angles are detected by the radar device, calculates the off-axis angle based on the relative-velocity components along the line of radar sight, and on the azimuthal angles, of a plurality of reflection points whose relative-velocity components in the traveling direction of the vehicular object are approximately equal to one another.

Here, in the above description, "reflection points" refer to points reflecting radar waves. Moreover, "a plurality of reflection points whose relative velocities being approximately equal to one another" refers to the plurality of reflection points where differences in the velocities thereof can be in practice negligible, and to be more specific, refers to the plurality of reflection points where the differences between the relative velocities thereof are within a predetermined value.

(Effects of the Invention)

As described above, according to an off-axis angle estimation method in the present invention, firstly, based on observed values by a radar device, a plurality of reflection points having approximately equal relative-velocity components in the traveling direction of a vehicular object is found out. Secondly, an off-axis angle of the radar is sought by combining only the relative-velocity components along the line of radar sight and azimuthal angles at the plurality of reflection points found out in this manner. In this process, data such as the traveling velocity and velocity-error magnification of the vehicular object mounted with the radar device is not used. Therefore, even in cases in which the traveling velocity of the vehicular object mounted with a radar device can not be obtained, it becomes possible to stably achieve off-axis angle estimation.

EXPLANATION OF NUMERALS AND SYMBOLS

Figure 1:
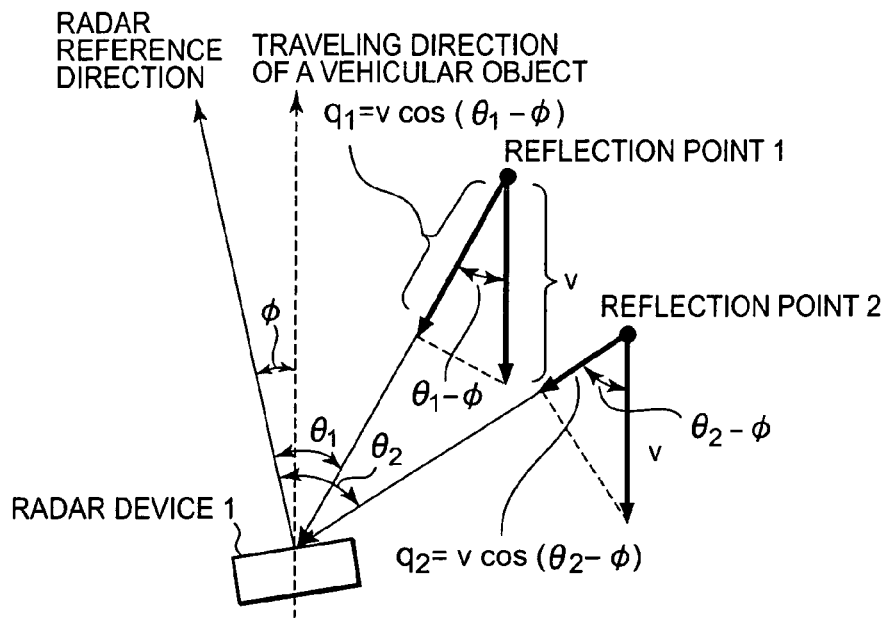
FIG. 1 is a conceptual diagram for explaining operating principles in Embodiment 1 of the present invention.

A radar device 1;
An off-axis angle estimation device 2;
Reflection point selectors 4, 41, 42, 43 and 44;
Off-axis angle calculators 5, 51, 52, 53 and 54; and
Off-axis angle true-value estimators 6 and 61.

BEST MODE FOR CARRYING OUT THE INVENTION

Hereafter, the embodiments of the present invention are explained by using figures.

Embodiment 1

To begin with, the operating principles of an off-axis angle estimation method in Embodiment 1 of the present invention are explained. FIG. 1 is a conceptual diagram for explaining the operating principles in Embodiment 1 of the present invention. In FIG. 1, a radar device 1 is, for example, a radar device mounted on a vehicular object such as a motor vehicle. Moreover, a reflection point 1 and a reflection point 2 are points of reflecting radar waves, detected by the radar device 1.

The radar device 1 is provided for detecting other vehicles exist in a traveling direction of the vehicular object, and obstacles such as road installation facilities. When the radar device 1 detects obstacles and/or other vehicles, the detected result is outputted to devices that are external to the radar device 1, for example, to a vehicular clearance maintaining device, an adaptive cruise control device, and the like, which are provided for uses such as velocity controls and increased safety.

In order to achieve these purposes, the radar device 1 possesses functions to calculate relative velocities and azimuthal angles at the reflection point 1 and the reflection point 2. These radar devices are getting widely used as, for example, on-vehicle millimeter-wave radars, and their configurations and operations are widely known; therefore, detailed descriptions are not given here.

Here, the vehicular object mounted with the radar device 1 is presumed traveling with an unknown velocity v in a traveling direction. Moreover, the radar device 1 possesses a predetermined radar reference direction. The radar reference direction is a direction that becomes a reference to an azimuthal angle obtained when a reflection point is observed. The radar reference direction is preferably coincident with the traveling direction of the vehicular object; however, there are many cases in which misalignment occurs owing to installation errors. Here, an angle between the radar reference direction and the traveling direction of the vehicular object (an "off-axis angle") is designated as $\phi$.

Furthermore, an off-axis angle estimation method in the present invention is applicable to not only off-axis angle estimation in azimuthal directions, but also off-axis angle estimation in elevation directions; however, in order here to make explanations easy to understand, it is presumed that the off-axis angle $\phi$ includes only an azimuthal component.

In order to make explanations simple, it is presumed that the reflection point 1 and the reflection point 2 are both stationary. In this case, if the vehicular object is regarded as a reference, the reflection point 1 and the reflection point 2 are both equivalent to those moving with the velocity v. When a relative-velocity component at the reflection point 1 detected by the radar device 1 along the line of radar sight ("a relative velocity with respect to the radar device 1") is set as $q_1$; a relative-velocity component at the reflection point 2 along the line of radar sight is set as $q_2$; and in addition, an azimuthal angle at the reflection point 1 detected by the radar device 1 is set as $\theta_1$, and an azimuthal angle at the reflection point 2 is set as $\theta_2$; as seen from FIG. 1, relationships are held among v, $\phi$, $\theta_1$, $q_1$, $\theta_2$, and $q_2$, as given by Equation (1) and (2).

(Equation "FIG. 1")

$$q_1 = v\cos(\theta_1 - \phi) \tag{1}$$

$$q_2 = v\cos(\theta_2 - \phi) \tag{2}$$

Here, in the following explanations, when a "relative velocity" is simply said, but not particularly expressed, it does refer to a relative-velocity component along the line of radar sight.

Equation (1) and Equation (2) form simultaneous equations including two unknowns v and $\phi$. By applying equation transformation to Equation (1) and Equation (2) so as to eliminate v, Equation (3) is obtained.

Figure 2:
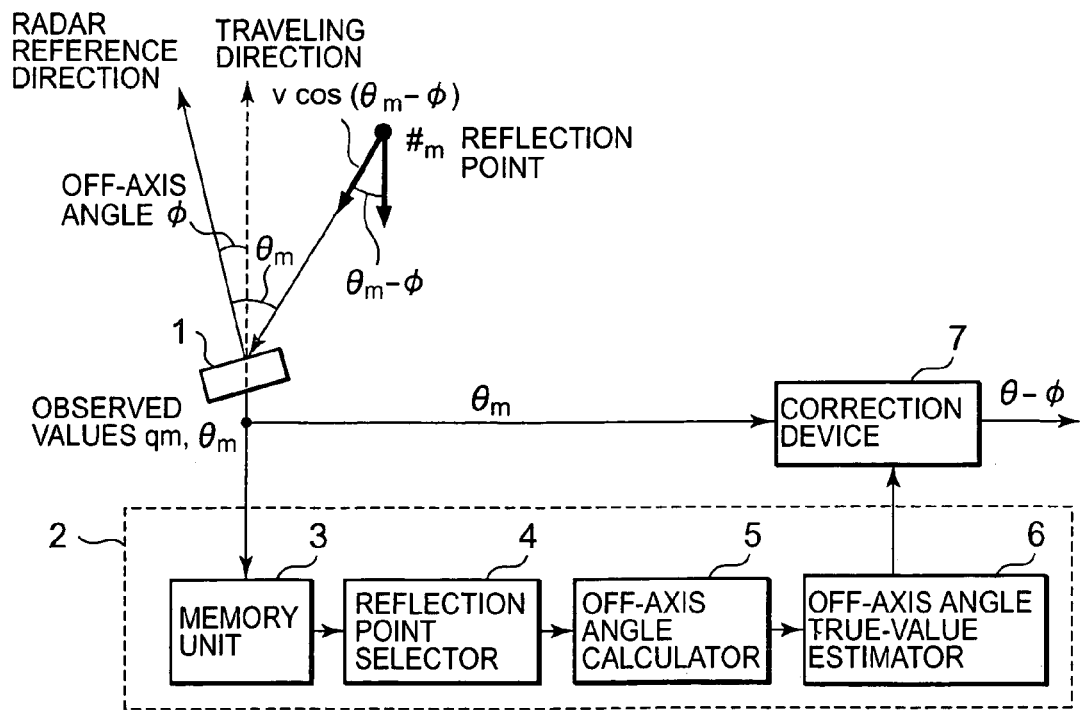
FIG. 2 is a block diagram showing a configuration in Embodiment 1 of the present invention.

(Equation "FIG. 2")

$$q_1/q_2 = \cos(\theta_1 - \phi)/\cos(\theta_2 - \phi) \tag{3}$$

Because Equation (3) is an equation only related the single unknown $\phi$, by solving this equation for $\phi$, then, $\phi$ can be determined independent of the velocity v. That is to say, even if the velocity of the vehicular object mounted with a radar device can not be sought, by combining at least two pairs of observed values at the reflection point 1 and the reflection point 2, the off-axis angle can be autonomously calculated solely from the observed values based on radar waves.

However, it should be noted that the discussions above are supported on the presumption that the reflection point 1 and the reflection point 2 are both stationary points. As a result, in Equation (1) and Equation (2), it becomes possible to eliminate the velocity v, and therefore, Equation (3) has been able to be derived. Whereas, even if the reflection point 1 and the reflection point 2 are not stationary points, when the relative-velocity components in the traveling direction of the vehicular object are equal to each other at the reflection points, in a similar manner, Equation (3) can be derived. As a consequence, it becomes possible to calculate the off-axis angle $\phi$ of the radar device 1.

Moreover, even when both the relative-velocity component in the traveling direction of the vehicular object at the reflection point 1 and the relative-velocity component in the traveling direction of the vehicular object at the reflection point 2 are not completely equal to each other, if the difference is sufficiently small as can be neglected, it is possible to calculate an off-axis angle based on Equation (3).

By the way, given that the relative-velocity component in the traveling direction of the vehicular object at the reflection point 1 is $v_1$, and the relative-velocity component in the traveling direction of the vehicular object at the reflection point 2 is $v_2$, then, $v_1$ and $v_2$ are presented by Equation (4) and Equation (5), respectively.

Figure 3:
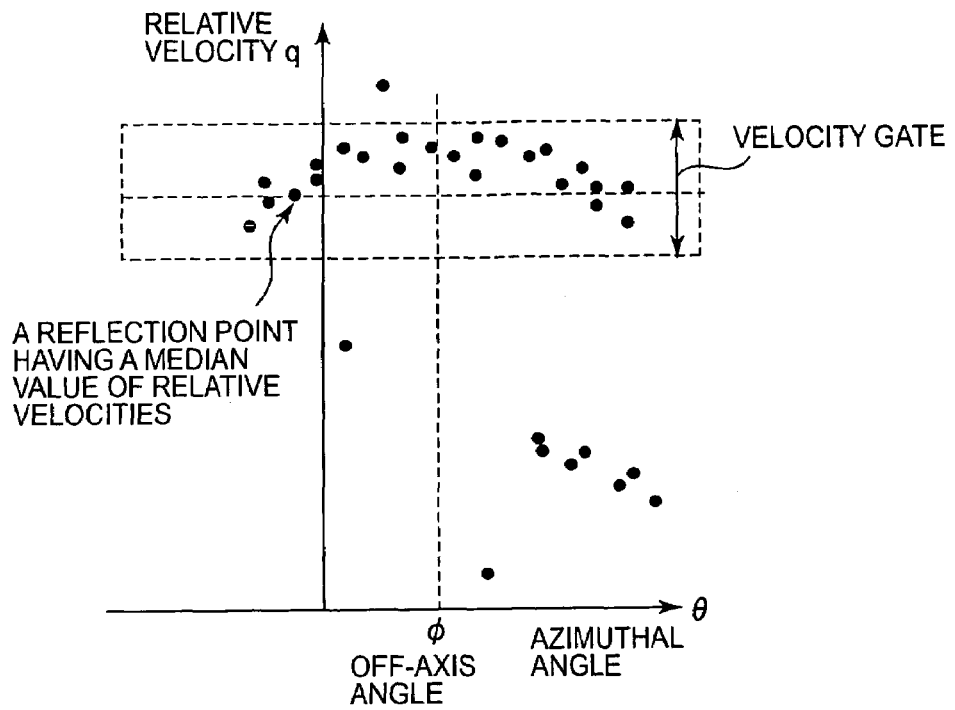
FIG. 3 is a diagram showing a distribution example of relative velocities and azimuthal angles of radar reflectors in Embodiment 1 of the present invention.

(Equation "FIG. 3")

$$v_1 = q_1/\cos(\theta_1 - \phi) \tag{4}$$

$$v_2 = q_2/\cos(\theta_2 - \phi) \tag{5}$$

Here, because $\theta_1$, $q_1$, $\theta_2$, and $q_2$ are calculated by the radar device 1, they can be treated as known values; however, $\phi$ remains unknown. Therefore, it is difficult to determine directly if the velocities $v_1$ and $v_2$ at two different reflection points are nearly equal to each other or not.

For these reasons, in conventional methods, it has not been possible to calculate an off-axis angle by directly solving Equation (3). As an alternative means, by using velocity information of the vehicular object, firstly, radar reflectors are determined if they are stationary objects or not; then, by focusing attention on the fact that error magnifications from a velocity sensor ("a ratio v/Vh between a true value v and an estimated value Vh obtained form the sensor") become approximately equal to one another without depending on the velocity of the vehicular object, a method to seek the off-axis angle $\phi$ has been adopted. Namely, given that true values of relative velocities obtained from the velocity sensor at two reflection points are $v_1$ and $v_2$, and estimated values at these reflection points are $Vh_1$ and $Vh_2$, they become $v_1/Vh_1 = v_2/Vh_2$. At this point, by dividing both sides of Equation (4) by $Vh_1$, Equation (6) is derived; in addition, by dividing both sides of Equation (5) by $Vh_2$, Equation (6) is derived.

Figure 4:
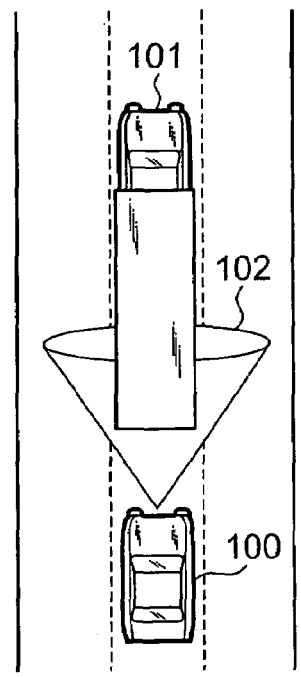
FIG. 4 is a diagram showing an example of the positional relationship between a vehicle itself and a forward vehicle, and the coverage of an on-vehicle radar in Embodiment 2 of the present invention.

(Equation "FIG. 4")

$$v_1/Vh_1 = (q_1/Vh_1)/\cos(\theta_1-\phi) \quad (6)$$

$$v_2/Vh_2 = (q_2/Vh_2)/\cos(\theta_2-\phi) \quad (7)$$

Because of $v_1/Vh_1 = v_2/Vh_2$, the right-hand side of Equation (6) becomes equal to the right-hand side of Equation (7). On one hand, conventional off-axis angle calculation methods have calculated $\phi$ based on these.

On the other hand, according to an off-axis angle estimation device in Embodiment 1 of the present invention, by focusing attention on the characteristics of distribution of reflection points, problems described above have been solved. Hereafter, through detailed explanations on the off-axis angle estimation device in Embodiment 1 of the present invention, this point will be made clear.

FIG. 2 is a block diagram showing a configuration of the off-axis angle estimation device in Embodiment 1 of the present invention. In the figure, the radar device 1 is functionally equivalent to that having been explained in the above operating principles.

An off-axis angle estimation device 2 is a device to estimate an off-axis angle of the radar device 1; and the device 2 comprises a memory unit 3, a reflection point selector 4, an off-axis angle calculator 5, and an off-axis angle true-value estimator 6. The memory means 3 is a unit that stores observed values starting with relative velocities and azimuthal angles at reflection points calculated by the radar device 1, and is composed of memory elements and circuits incorporating, as a preferable case, a random-access memory of fast responding performance.

The reflection point selector 4 is a unit that, from among observed values at the reflection points stored in the memory unit 3, selects observed values in order to calculate an off-axis angle. The off-axis angle calculator 5 is a unit that calculates an off-axis angle by using the observed values selected by the reflection point selector 4. The off-axis angle true-value estimator 6 is a unit that, in cases when there exists a plurality of off-axis angles ("candidate values for an off-axis angle") having been calculated by the off-axis angle calculator 5, estimates a true value of off-axis angle by using the plurality of candidate values for the off-axis angle.

Note that, here, each unit described above is directly meant for those special-purpose circuits or elements so as to realize predetermined functions and operations. However, based on present-day levels in technologies, by combining a general-purpose central processing unit (CPU) or a digital signal processor (DSP) with a computer program as software, it can be understood that equivalent functions can be easily realized. In this case, by providing a control means such as a CPU and a DSP, it can be configured that instruction codes are provided as a computer program so that processing that corresponds to each of the units such as the reflection point selector 4, the off-axis angle calculator 5, and the off-axis angle true-value estimator 6, is executed by the control means. Therefore, it should be noted that a configuration is not necessarily limited to interpretation of those special-purpose circuits or elements.

Moreover, a correction device 7 is a device that, based on an observed value calculated by the radar device 1 and the off-axis angle calculated by the off-axis angle estimation device 2, outputs a correction result by correcting the azimuthal angle of a reflector. Eventually, the result outputted from the correction device 7 is provided for uses such as velocity controls and increased safety.

Next, the operations of the off-axis angle estimation device 2 are explained. Observed-values at reflection points, detected by the radar device 1, are stored in the memory unit 3. The reflection point selector 4 selects, among reflection points of which observed values are stored in the memory unit 3, in focusing on the characteristics of the reflection points, two or more reflection points of which the relative-velocity components in the traveling direction of the vehicular object are presumed approximately equal to each other. Here, such "characteristics of the reflection points" are described as below.

When the vehicular object is driven like a motor vehicle on a road surface, it can be regarded that other motor vehicles, road installation facilities such as road signs and guardrails, and the road surface itself become radar reflectors. FIG. 3 is a diagram showing a distribution example of relative velocities and azimuthal angles of those radar reflectors detected when the radar device 1 is mounted on a motor vehicle vehicular along a driving lane on a road.

Because the road surface or road installation facilities or other motor vehicles possess a size larger than certain specific one as radar reflectors, a plurality of reflection points may be observed on the same radar reflector. At a plurality of reflection points being present on the same radar reflector, it must be said that the relative-velocity components in the traveling direction of the vehicular object become approximately equal to one another. As a reflector such as this, a most noticeable one is a road surface. In many cases, because the road surface becomes the largest in size as a radar reflector, it can be regarded that the proportion of reflection points being present on the road surface to all the reflection points is large.

As described above, in distribution of observed reflection points, because the reflection points on the road surface account for most of samples, there are many cases in which the reflection points on the road surface become, in distribution of relative velocities, reflection points having a median value of the relative velocities. In addition to this, in a range surrounding the median value, reflection points being similarly present on the road surface must be distributed.

Hence, the reflection point selector, 4, firstly in a distribution of relative velocities at reflection points stored in the memory unit 3, specifies a median value of the relative velocities as a reference velocity. Next, by centering on the reference velocity, a range of values having a predetermined width (referred to as "a velocity gate") is determined. The reflection point selector 4 selects the reflection points of the relative velocities included in the range of values by assuming that the reflection points possess relative-velocity components in the traveling direction of the vehicular object approximately equal to those reflection points having been referenced.

The off-axis angle calculator 5, based on azimuthal angles at the reflection points selected by the reflection point selector 4, calculates an off-axis angle of the radar device 1. An off-axis angle can be calculated by solving Equation (3) for $\phi$. However, because Equation (3) is a non-linear equation, it is more advantageous to solve the equation based on a method to obtain an approximate solution than to solve it analytically. Because those methods to calculate an approximate solution such as this are widely known as various kinds of methods, detailed descriptions are not given here.

As described above, in the off-axis angle estimation device 2, by focusing attention on the characteristics of a radar mounted on the vehicular object in which many of the reflection points are present on such as the road surface, those reflection points are selected so that the relative-velocity components in the traveling direction of the vehicular object are approximately equal to one another. According to an off-axis angle estimation method in Embodiment 1 of the present invention, without using velocity information on the vehicular object with the radar device 1, a reflection point can be selected as a reference necessary for calculating an off-axis angle, and without obtaining a velocity of the vehicular object, it becomes possible to calculate the off-axis angle.

The above descriptions are among the most basic characteristics of the off-axis angle estimation device 2 in Embodiment 1 of the present invention. By only using the constituent elements up to this point, even when a traveling velocity of the vehicular object can not be obtained, it can be understood that an off-axis angle can be calculated.

Moreover, according to Equation (3), by obtaining two reflection points with relative velocities along the line of radar sight and azimuthal angles, an off-axis angle can be calculated; however, a problem arises when more than two reflection points are included in a range of values having a predetermined width centering on a reference velocity. It is because, in this case, for example, depending on a manner to select those reflection points, different off-axis angles $\phi$ may be calculated. However, even in this case, because the off-axis angle true-value estimator 6 is provided, without raising contradiction in calculated results, highly reliable off-axis angle estimation is made possible. Hereafter, this point will be explained.

When more than two reflection points are included in a range of values having a predetermined width centering on a reference velocity, the reflection point selector 4 can select, among those reflection points, for example, unconditionally all the reflection points. The off-axis angle calculator 5, by combining every two out of the reflection points selected by the reflection point selector 4, calculates a corresponding off-axis angle from the combined pairs of reflection points.

For example, the reflection points selected by the reflection point selector 4 are denoted as a first reflection point, a second reflection point, and a third reflection point. Now, the off-axis angle calculator 5 calculates not only an off-axis angle from the first reflection point and the second reflection point, but also an off-axis angle from either the first reflection point and the third reflection point, or the second reflection point and the third reflection point. Then, the off-axis angle obtained from the first reflection point and the second reflection point is denoted as a first off-axis angle; and the off-axis angle obtained from either combination of the first reflection point with the third reflection point, or that of the second reflection point with the third reflection point is denoted as a second calculated angle.

The off-axis angle true-value estimator 6, based on the first off-axis angle and on the second off-axis angle having been calculated by the off-axis angle calculator 5, estimates a true value of the off-axis angle. As a true-value estimation method for the off-axis angle, it is recommended to apply, for example, a method to calculate an average value of the first off-axis angle and the second off-axis angle, or a method to calculate an off-axis angle of which error of squares between the first off-axis angle and the second off-axis angle becomes minimum (that is well known as "the method of least squares"), or a total least-squares (TLS) method. Furthermore, when there are three or more off-axis angles having been calculated by the off-axis angle calculator 5, a similar method can be taken.

The true value of the off-axis angle calculated according to the above is eventually outputted, as an output value, from the off-axis angle estimation device 2, to the correction device 7. The correction device 7 calculates a value by adding the true value of off-axis angle to or subtracting the same from a value $\theta$ observed by the radar device 1, so as to output the value to external velocity-control devices and the like.

As described above, by providing the off-axis angle true-value estimator 6, with increase of the number of reflection points used for calculating an off-axis angle, it becomes possible to enhance reliability of the off-axis angle estimation.

As has been made clear in the above description, according to an off-axis angle estimation device in Embodiment 1 of the present invention, by focusing attention on characteristics of distribution of reflection points, those reflection points are selected so that the relative-velocity components in the traveling direction of a vehicular object are approximately equal to one another; therefore, without separately obtaining the velocity of the vehicular object, it becomes possible to estimate an off-axis angle of radar device.

By the way, when the radar device 1 observes reflection points at predetermined sampling intervals, by applying feedback of an output from the off-axis angle true-value estimator 6 to the off-axis angle calculator 5, reflection points to be selected can be reduced by using tracking processing, such as a Kalman filter.

Embodiment 2

In the off-axis angle estimation device in Embodiment 1, reflection points are selected to have a median value of relative velocities as a reference velocity; however, instead of taking this manner, a reflection point having a maximum value among the relative velocities can be selected as the reference velocity. Namely, by assuming that the reflection point having the maximum value among the relative velocities is a reflection point on a road surface, a velocity gate (a range of values in which difference among the relative velocities to each other becomes within a predetermined value) is determined with reference to the relative velocity at the reflection point. Then, the reflection point selector 4 is allowed to select a plurality of reflection points that is included in the velocity gate.

For example, there may be an instance in which motor vehicles and the like driving on an express way have a velocity difference to a road surface that is significantly greater than that to other vehicles. In this instance, because the reflection point having a maximum value among the relative velocities becomes a reflection point on the road surface, it becomes possible to adopt such an assumption as described above.

Figure 5:
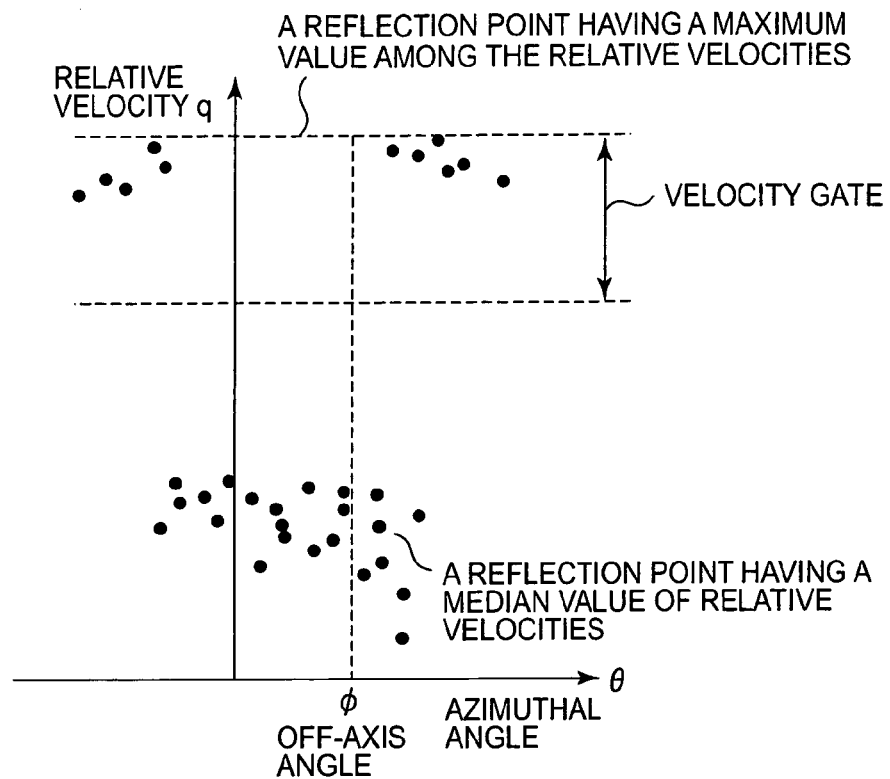
FIG. 5 is a diagram showing a distribution example of relative velocities and azimuthal angles of radar reflectors in Embodiment 2 of the present invention.

For another example, as shown in FIG. 4, when a large-size vehicle 102 is driving in direct front of a vehicle itself 100, in a coverage 102 brought by the radar device 1, a proportion of the coverage belonging to the road surface to all the coverage becomes small. In such cases, distribution of reflection points comes into such a state as shown in FIG. 5; thus, possibility becomes high in which a reflection point having a median value of relative velocities does not belong to the reflection points in which the road surface is a radar reflector. As a result, there may be a case in which, it does not become possible, after having determined a velocity gate with reference to the median value, to select reflection points suitable to calculate an off-axis angle from among them.

Even in a case such as this, it can be regarded that the reflection points each that are included in a velocity gate determined with reference to a reflection point having a maximum value among the relative velocities are stationary objects. Therefore, when a plurality of reflection points can be selected, differences between the relative velocities of the reflection points are almost nil. Accordingly, between those reflection points, the relationship of Equation (3) is held. By solving Equation (3) obtained as above, it becomes possible to calculate ail off-axis angle $\phi$. In consequence, similarly to the case using the median value of the relative velocities, it is possible to realize an effective off-axis angle estimation process.

Moreover, in this Embodiment 2, instead of using the median value, a configuration has been shown in which a maximum value is specified as the reference velocity; however, various kinds of other statistical values that represent characteristics of observed sample groups can be also applied.

In a real situation, in order to exclude abnormally observed values, there may be a case in which, instead of using the maximum value, for example, a configuration using the tenth largest velocity as the reference velocity can lead to more reliable estimation.

Embodiment 3

In the off-axis angle estimation method in Embodiment 1 or Embodiment 2, a configuration has been made in which a relative velocity at any one of reflection points is specified as the reference velocity, and reflection points are then selected so that relative velocities are included in a range of values having a predetermined width centering on the reference velocity. Instead of taking this manner, by finding a range of values in which a frequency becomes a predetermined number or greater in distribution of relative velocities, and by determining the range of values as a velocity gate, the reflection point selector 4 is allowed to select reflection points that are included in this range of values.

Equation (3) holds between two of the reflection points at which the relative-velocity components in the traveling direction of a vehicular object are approximately equal to one another. Therefore, not necessarily limited to reflection points on a road surface, it can be realized that a plurality of reflection points is selected on the same radar reflector that is larger than a predetermined size. With respect to a radar reflector such as this, the radar device 1 will be lead to observe a plurality of reflection points.

Therefore, in distribution of relative velocities, by detecting a range of values in which frequency becomes a predetermined number or greater, so as to select reflection points that are included in the range of values having been detected, it becomes possible to select reflection points on the same radar reflector. Hence, it becomes possible to select a plurality of reflection points at which the relative-velocity components in the traveling direction of a vehicular object are approximately equal to one another; then, based on observed values at the reflection points having been selected, an off-axis angle estimation processing can be realized.

Figure 6:
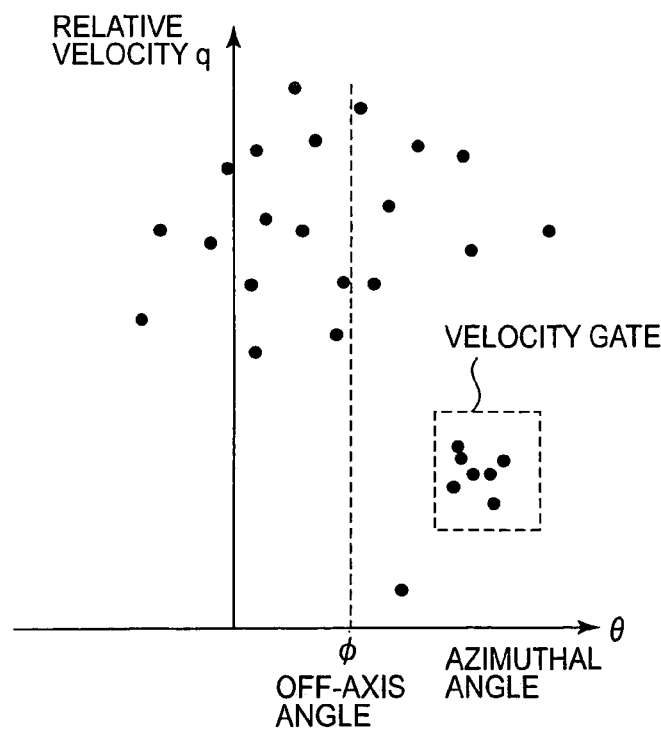
FIG. 6 is a diagram showing a distribution example of relative velocities and azimuthal angles of radar reflectors in Embodiment 3 of the present invention.

Moreover, when a plurality of reflection points is selected on other vehicles, the size of a radar reflector also has characteristics in that it does not become so large as a road surface. The reflection points included in the velocity gate shown in FIG. 6 are this kind of reflection points on other vehicles. Therefore, it can be realized that distribution of azimuthal angles is utilized as combined. Namely, by adopting a plurality of reflection points at which, relative velocities as well as values of azimuthal angles are proximal to each other, possibility of the reflection points being present on the same radar reflector becomes high; thus, accuracy in off-axis angle estimation is enhanced.

In this way, by selecting a radar reflector for off-axis angle estimation based on frequency distribution of relative velocities, even under such special circumstances in which few reflection points belong to a road surface exist, it becomes possible to estimate an off-axis angle. For example, even when a large-size truck is driving in front of the vehicle itself, a considerable proportion of the radar coverage is blocked out, it becomes possible to estimate an off-axis angle.

Embodiment 4

In the off-axis angle estimation methods in Embodiment 1 through 3, by determining a range of values in which a plurality of reflection points is presumably present having approximately equal relative-velocity components in the traveling direction of a vehicular object, so that reflection points whose relative velocities are included in this range of values are selected, a configuration has been made in which an off-axis angle is estimated based on the reflection points having been selected. However, it is not necessary to limit to just only one the number of ranges of values for selecting the reflection points used for off-axis angle estimation.

Namely, in distribution of relative velocities at reflection points, a plurality of reference velocities is beforehand specified. Presumably, let these reference velocities be denoted as a first reference velocity and a second reference velocity. Then, after determining a plurality of ranges of values having predetermined widths centering on the first reference velocity and on the second reference velocity, a plurality of reflection points included in the respective ranges of values is selected.

By this way, a first off-axis angle is calculated based on azimuthal angles at reflection points having been selected from a range of values centering on the first reference velocity, and a second off-axis angle is calculated based on azimuthal angles at reflection points having been selected from a range of values centering on the second reference velocity; then, based on the first and second off-axis angles having been calculated, a true value of the off-axis angle of a radar device is estimated. An off-axis angle estimation method in Embodiment 4 of the present invention has these characteristics.

Figure 7:
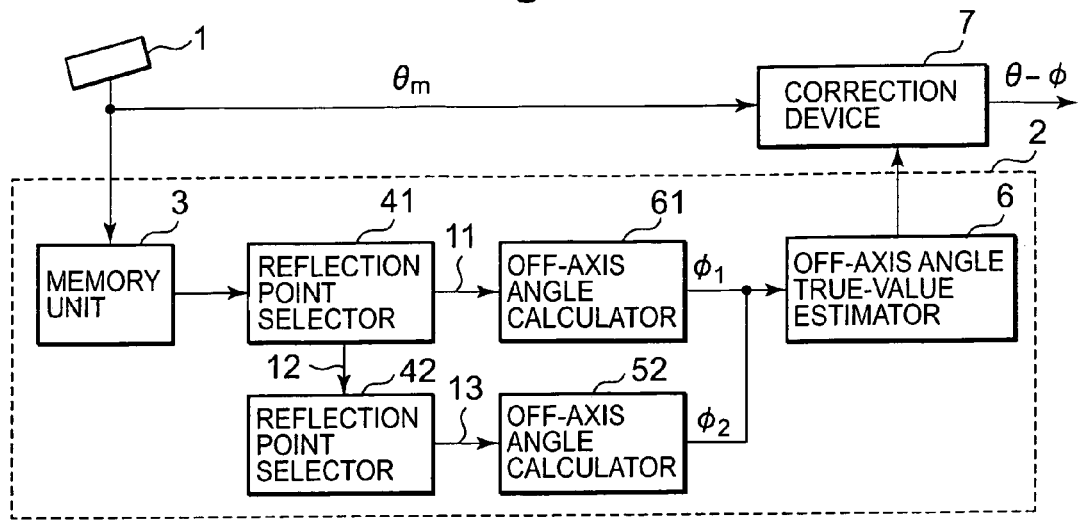
FIG. 7 is a block diagram showing a configuration in Embodiment 4 of the present invention.

FIG. 7 is a block diagram showing a configuration of an off-axis angle estimation device in Embodiment 4 of the present invention. In the figure, a reflection point selector 41 is a unit that selects the reflection points included in a velocity gate having a predetermined relative velocity as the reference; a plurality of selected reflection points is outputted as reflection points 11, and non-selected reflection points are outputted as reflection points 12. A reflection point selector 42 is a unit that, among the reflection points 12 having been outputted from the reflection point selector 41, selects reflection points included in a velocity gate having a predetermined relative velocity as the reference.

An off-axis angle calculator 51 is a unit that, based on azimuthal angles at the reflection points 11, calculates an off-axis angle $\phi_1$.

Moreover, an off-axis angle calculator 52 is a unit that, based on azimuthal angles at the reflection points 13, calculates an off-axis angle $\phi_2$. Other constituent elements having the same reference numerals and symbols as those in FIG. 2 are equivalent or similar to those in Embodiment 1; thus their explanation is omitted.

Next, the operations of the off-axis angle estimation device in Embodiment 4 of the present invention are explained. Similarly to Embodiment 1, the reflection point selector 41 determines, among relative velocities at reflection points having been stored in the memory unit 3, with a median value of the relative velocities being specified as the reference velocity (the first reference velocity), a velocity gate of predetermined widths on the upper and lower sides of the reference velocity. On one hand, after having selected a plurality of reflection points of which relative velocities are included in the velocity gate, the reflection points 11 are outputted; on the other hand, among relative velocities having been stored in the memory unit 3, the reflection points 12 are outputted as non-selected reflection points other than the reflection points 11. The reflection points 11 become in many cases reflection points in which a road surface is a radar reflector. However, as described in Embodiment 2, in cases in which a large-size vehicle is driving in direct front of a vehicular object mounted with the radar device 1, and when a considerable proportion of the radar coverage is blocked out by the large-size vehicle, it can be regarded that the reflection points 11 are to be selected as reflection points in which the large-size vehicle is a radar reflector.

The reflection point selector 42 determines anew, among relative velocities at reflection points 12, with a median value of the relative velocities being specified as a reference velocity (the second reference velocity), a velocity gate of predetermined widths on upper and lower sides of the reference velocity. After having selected a plurality of reflection points of which relative velocities are included in the velocity gate, the reflection points 13 are outputted.

In a manner similar to Embodiment 1, the off-axis angle calculator 51 calculates, based on azimuthal angles at a plurality of reflection points having been selected as the reflection points 11, the off-axis angle $\phi_1$ (the first off-axis angle). Similarly, the off-axis angle calculator 52 calculates, based on azimuthal angles at a plurality of reflection points having been selected as the reflection points 13, the off-axis angle $\phi_2$ (the second off-axis angle).

Next, the off-axis angle true-value estimator 6 calculates an average value of the off-axis angle $\phi_1$ and the off-axis angle $\phi_2$, and outputs to a correction device 7 the average value as a final output value from the off-axis angle estimation device 2.

According to the method described above, because a plurality of velocity gates is determined, velocity-difference spread in each of the velocity gates can be made small; in consequence, velocity differences between reflection points included in the velocity gates become small. Because of this, accuracy in off-axis angle estimation calculated in each velocity gate is enhanced. In addition, because an off-axis angle is estimated by using the off-axis angle calculated, in this manner, in each velocity gate, accuracy in off-axis angle estimation becomes high.

Moreover, in Embodiment 4, a configuration has been shown in which, from among reflection points included in each of velocity gates, a median value of relative velocities is selected so as to be adopted as the reference velocity; however, it is needless to say that, in a manner similar to that in Embodiment 2, a maximum value or various kinds of statistical values can be also applied.

Furthermore, a different kind of statistical values can be applied to each of the velocity gates. For example, the reflection point selector 41 specifies a maximum value of relative velocities as the reference velocity when possibility of selecting reflection points in which a road surface is a radar reflector becomes presumably high; on the other hand, the reflection point selector 42 specifies a median value of relative velocities as a reference velocity. Alternatively, a converse combination can be also applied.

Furthermore, a different width for the range of values can be adopted to each of the velocity gates. In addition, depending on velocity gates, distribution of azimuthal angles can also be used as the reference.

Embodiment 5

The off-axis angle estimation methods described in Embodiment 1. through 4 have characteristics in that, in order to estimate an off-axis angle, there is no need to obtain a traveling velocity of a vehicular object. However, it is presumed that relative velocities between a plurality of reflection points used for off-axis angle estimation are approximately equal to one another. In consequence, it is preferable that the traveling velocity of the vehicular object is approximately constant during the time of observed values at those reflection points being collected.

In addition, because it is necessary that azimuthal angles at a plurality of reflection points used for off-axis angle estimation are obtained under the same reference, it is preferable for the vehicular object to move straight during the time those observed values are collected.

By the way, when the radar device 1 is mounted on a motor vehicle, influenced by road conditions and traffic flow, it is in many cases anticipated that straight-ahead driving can not be continued for a long term; because of this, it is presumed that observed values can not be sufficiently collected. As a result, it may be considered that the estimation accuracy becomes deteriorated, and adversely affecting a safety aspect.

Now, in Embodiment 5, an off-axis angle estimation device is explained that allows, by combining reflection points at different time intervals, velocity variations during collection of observed values, and what is more, variations in traveling directions.

Figure 8:
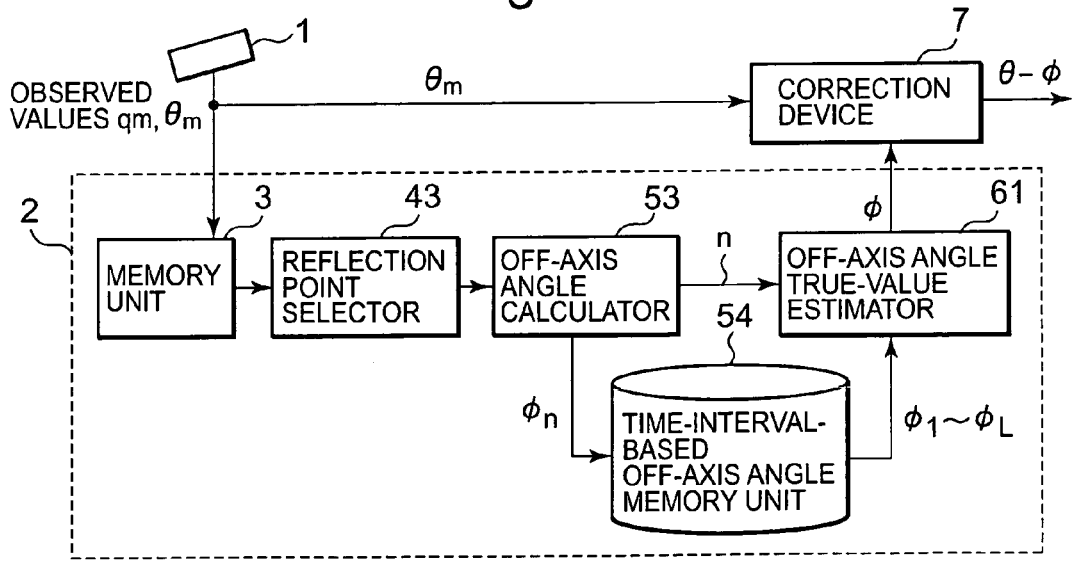
FIG. 8 is a block diagram showing a configuration in Embodiment 5 of the present invention.

FIG. 8 is a block diagram showing a configuration of the off-axis angle estimation device in Embodiment 5 of the present invention. In the figure, a reflection point selector 43 is a unit that selects a plurality of predetermined reflection points for each time interval between a time interval 1 and a time interval L. Moreover, an off-axis angle calculator 53 is a unit that, by using azimuthal angles at reflection points having been selected at a time interval n ("n" denotes one of the natural numbers "1" through "L"), calculates an off-axis angle $\phi_n$ at the time interval n. The off-axis angle $\phi_n$ at each of the time intervals 1 through L is arranged so that it is stored in a time-interval-based off-axis angle memory unit 54.

Furthermore, an off-axis angle true-value estimator 61 is a unit that estimates a true value of off-axis angle $\phi$ based on off-axis angles $\phi_1$ through $\phi_L$ calculated at each of the time intervals. Other constituent elements having the same reference numerals and symbols as those in FIG. 2 are equivalent or similar to those in Embodiment 1; thus their explanation is omitted.

Next, the operations of the off-axis angle estimation device in Embodiment 5 of the present invention are explained. Here, at the time interval 1 through the time interval L, it is considered that the traveling velocity of an vehicular object and the angle of the traveling direction of the vehicular object are varying. However, in comparison to a rate of traveling velocity variance ("acceleration") of the vehicular object and the curvature of movement of the vehicular object, each of the time interval 1 through the time interval L is assumed to be sufficiently shorter than those. As a result, the traveling velocity of the vehicular object can be presumed approximately constant, within each time interval; and in addition, the vehicular object can be presumed to move straightly ahead.

A memory unit 3 stores relative velocities and azimuthal angles at reflection points observed at each of the time interval 1 through the time interval L. A reflection point selector 43, in a manner similar to that in Embodiment 1 or Embodiment 2, among relative velocities at reflection points at the time interval n ("n" denotes one of the natural numbers "1" through "L") having been stored in the memory unit 3, specifies a median value or a maximum value of the relative velocities as a reference velocity; and by determining as the velocity gate a range of values having a predetermined width centering on the reference velocity, a plurality of reflection points included in the velocity gate is then selected and outputted to an off-axis angle calculator 53.

Now, as these time intervals, a first time-interval n1 and a second time-interval n2 are considered. Where, "n1" and "n2" are both natural numbers of any of "1" through "L". The off-axis angle calculator 53, based on a plurality of reflection points having been selected by the reflection point selector 43 at the time interval n1, similarly to Embodiment 1, calculates a first off-axis angle $\phi_{n1}$ and stores it in the time-interval-based off-axis angle memory unit 54. In addition, "n1" as an identifier of the time interval is outputted to the off-axis angle true-value estimator 61.

Moreover, the off-axis angle calculator 53, based on azimuthal angles at a plurality of reflection points having been selected by the reflection point selector 43 at the time interval n2, calculates a second off-axis angle $\phi_{n2}$ and stores it in the time-interval-based off-axis angle memory unit 54; on the other hand, "n2" as an identifier of the time interval is outputted to the off-axis angle true-value estimator 61.

When the time-interval identifier n having been outputted from the off-axis angle calculator 53 becomes equal to "L", the off-axis angle true-value estimator 61, at this moment, outputs the off-axis angle $\phi$ as a mean value of off-axis angles $\phi_1$ through $\phi_n$ having been stored in the time-interval-based off-axis angle memory unit 54. That is, to be specific, as follows:

(Equation "FIG. 5")

$$\phi = \frac{1}{L}\sum_{i=1}^{L}\phi_i \qquad (8)$$

By this way, even if a vehicular object is varying its traveling velocity or direction, by dividing observation time into adequately short intervals, it is possible to reduce a plurality of reflection points having approximately equal relative-velocity components in the traveling direction of the vehicular object. As a result, based on the relative velocities along the line of radar sight and on the azimuthal angles at the reflection points having been reduced, it becomes possible to calculate an off-axis angle.

In particular, in an off-axis angle calculator 5, in cases that, based on simultaneous equations with reference to three or more reflection points, unknowns v and $\phi$ are estimated by applying the method of least squares, different estimation values may be obtained for each time interval with respect to v. But, the present invention has focused attention on the fact that an off-axis angle becomes constant without depending on time intervals ($\phi_{n1}=\phi_{n2}$).

In this manner, according to an off-axis angle estimation method in Embodiment 5 in the present invention, even when constant-velocity driving or straight-ahead driving can not be continued for a long term, an off-axis angle is calculated based on reflection points having been observed at a time interval within a predetermined time duration. What is more, because a plurality of off-axis angles having been calculated for each of time intervals is averaged, it becomes possible to secure sufficient estimation accuracy.

Furthermore, in a case of a vehicular object having no variations in traveling velocity nor direction, for example, even under the circumstances in which, in direct front of the vehicle itself, a large-size vehicle blocking out a considerable proportion of the radar coverage is driving with acceleration or deceleration, or changing directions to the right or the left, it becomes possible to apply the above configuration.

Embodiment 6

In Embodiment 1 through 5, a configuration has been made in which, a plurality of reflection points having approximately equal relative-velocity components in the traveling direction of the vehicular object is selected in advance and based on the relative-velocity components along the line of radar sight and on the azimuthal angles at the reflection points having been selected, an above-mentioned off-axis angle is calculated. However, instead of a configuration such as this, by combining the reflection points into pairs so as to calculate off-axis angles beforehand, a configuration can be adopted so that those-pairs of reflection points at which calculated off-axis angles converge within a predetermined range are selected afterward. The off-axis angle estimation device in Embodiment 6 has these characteristics.

Figure 9:
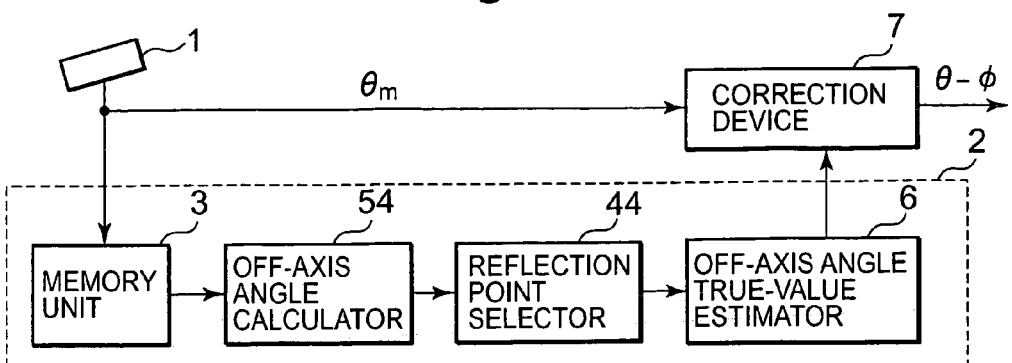
FIG. 9 is a block diagram showing a configuration in Embodiment 6 of the present invention.

FIG. 9 is a block diagram showing a configuration of the off-axis angle estimation device in Embodiment 6 of the present invention. In the figure, an off-axis angle calculator 54 is a unit that calculates a plurality of off-axis angles by combining two of the reflection points, as a pair, based on reflection points having been detected by the radar device 1. A reflection point selector 44 is a unit that, based on distribution of a plurality of the off-axis angles having been calculated by the off-axis angle calculator 54, selects pairs of reflection points usable for calculating a true value of off-axis angle. Other constituent elements having the same reference numerals and symbols as those in FIG. 1 are equivalent or similar to those in Embodiment 1.

Next, the operations of the off-axis angle estimation device are explained. The off-axis angle calculator 54 selects two of the reflection points, as a pair, among reflection points having been stored in the memory unit 3, and, by assuming that these reflection points possess approximately equal relative-velocity components in the traveling direction of the vehicular object, calculates the off-axis angle $\phi$ with the relationship given by Equation (3). Here, as a method of selecting two reflection points, all the combinations of any two reflection points among the reflection points having been stored in the memory unit 3 are selected.

However, there may be a case in which the number of reflection points becomes enormous. In this case, the number of reflection points may be reduced in advance by some methods. For example, as described in Embodiment 5, two reflection points may be combined as a pair exclusively from among reflection points detected at a predetermined time interval. Alternatively, with reference to relative velocities of any reflection points, along the line of radar sight, determining a range of values having a predetermined width, two reflection points among only the reflection points included in the range of values can be combined with each other as a pair.

Subsequently, the reflection point selector 44 selects, based on a degree of convergence of off-axis angles calculated by the off-axis angle calculator 54, reflection points. That is to say, a range of angles of in which off-axis angles having been calculated by the off-axis angle calculator 54 mainly distribute is sought from distribution of the off-axis angles, so that reflection points included in this range of angles are selected.

Two or more reflection points having the relative-velocity components in the traveling direction of the vehicular object being approximately equal to one another are in most cases present on the same radar reflector that possesses a certain size. Among reflection points on different radar reflectors, when an off-axis angle is calculated by combining with each other the reflection points of which the relative-velocity components in the traveling direction of the vehicular object are also different, its result becomes different from the true value; however, it can be expected that the frequency of such off-axis angles being calculated becomes lower than that of off-axis angles surrounding the true value being calculated.

Therefore, after having calculated off-axis angles in reality, and by selecting reflection points based on their convergence state, selecting pairs of reflection points that do not satisfy Equation (3) can be curbed, leading to calculate a more reliable off-axis angle.

Finally, an off-axis angle true-value estimator 6 estimates, among off-axis angles having been calculated by the off-axis angle calculator 54, and based on off-axis angles corresponding to reflection points having been selected by the reflection point selector 44, a true value of off-axis angle. This true-value estimation method is similar to those already described in Embodiment 1 through 5.

Moreover, in this Embodiment 6, a method has been explained in which, by combining two of the reflection points into pairs, an off-axis angle is calculated in the off-axis angle calculator 54. However, other than this method, similarly to Embodiment 1 through 5, it is needless to say that, by combining the reflection points into sets of three of more reflection points and using a method such as the method of least squares, an off-axis angle can be calculated.

INDUSTRIAL APPLICABILITY

According to the above, an off-axis angle estimation method in the present invention is useful for a radar device, in particular, that mounted on a vehicular object.

What is claimed is:

1. An off-axis estimation method for estimating an off-axis angle of a radar device mounted on a vehicular object, the off-axis angle estimation method comprising:
   detecting relative-velocity components along the line of radar sight and azimuthal angles of a plurality of reflection points by said radar device;
   selecting a plurality of the detected reflection points whose relative-velocity components in the traveling direction of the vehicular object are approximately equal; and
   calculating the off-axis angle based on the relative-velocity components along the line of radar sight and the azimuthal angles of the plurality of selected reflection points,
   wherein selecting a plurality of the detected reflection points whose relative-velocity components in the traveling direction of the vehicular object are approximately equal includes selecting, from among reflection points detected by the radar device, a plurality of the reflection points so that the radar-device off-axis angle being calculated based on the relative velocities along the line of vehicular-object radar-sight and on the azimuthal angles of the reflection points is distributed within a predetermined range of values.

2. An off-axis angle estimation apparatus for estimating an off-axis angle of a radar device mounted on a vehicular object, with there being reflection points whose relative-velocity components along the line of radar sight and whose azimuthal angles are detected by said radar device, the off-axis angle estimation apparatus, comprising:
   a reflection point selection means for selecting a plurality of detected reflection points whose relative-velocity components in the traveling direction of the vehicular object are approximately equal; and
   an off-axis angle calculation means for calculating the off-axis angle based on the relative-velocity components along the line of radar sight and the azimuthal angles of the plurality of selected reflection points, wherein the reflection-point selection means;
   specifies the relative-velocity component, along the line of radar sight, of any one of the reflection points detected by the radar device as a reference velocity; and
   selects a plurality of reflection points whose relative-velocity component along the line of radar sight is in a range of values having a predetermined width centering on the reference velocity; and
   wherein the reflection-point selection means selects a first reflection point, a second reflection point, and third reflection point, from among the detected reflection points so that the relative-velocity components in the traveling direction of the vehicular object are approximately equal to each other;
   the off-axis angle calculation means calculates a first off-axis angle based on the relative-velocity components along the line of radar sight and on the azimuthal angles of the first and the second reflection points, and a second off-axis angle based on the relative-velocity components along the line of radar sight and on the azimuthal angles of either the first or the second reflection point and the third reflection point; and
   wherein the apparatus further comprises an off-axis angle true-value estimation means for estimating a true value of the off-axis angle of said radar device based on the first and the second off-axis angles calculated by said off-axis angle calculation means.

3. An off-axis angle estimation apparatus for estimating an off-axis angle of a radar device mounted on a vehicular object, with there being reflection points whose relative-velocity components along the line of radar sight and whose azimuthal angles are detected by said radar device, the off-axis angle estimation apparatus, comprising:
   a reflection point selection means for selecting a plurality of detected reflection points whose relative-velocity components in the traveling direction of the vehicular object are approximately equal; and
   an off-axis angle calculation means for calculating the off-axis angle based on the relative-velocity components along the line of radar sight and the azimuthal angles of the plurality of selected reflection points, wherein the reflection-point selection means;
   specifies the relative-velocity component, along the line of radar sight, of any one of the reflection points detected by the radar device as a reference velocity; and selects a plurality of reflection points whose relative-velocity component along the line of radar sight is in a range of values having a predetermined width centering on the reference velocity; and wherein the reflection-point selection means specifies the relative-velocity component, along the line of radar sight, of any one of the reflection points detected by the radar device, as a first reference velocity and another one of the reflection points detected by the radar as a second reference velocity, and selects respective pluralities of reflection points whose relative-velocity components are in a range of values having a predetermined width centering on the first and the second reference velocities;

the off-axis angle calculation means calculates a first off-axis angle based on the relative-velocity components along the line of radar sight and on the azimuthal angles of the plurality of reflection points selected from a range of values centering on the first reference velocity, and also a second off-axis angle based on the relative-velocity components along the line of radar sight and on the azimuthal angles of the plurality of reflection points selected from a range of values centering on the second reference velocity; and, the apparatus further comprises an off-axis angle true-value estimation means for estimating a true value of the off-axis angle of said radar device based on the first and the second off-axis angles calculated by said off-axis angle calculation means.

4. An off-axis angle estimation apparatus for estimating an off-axis angle of a radar device mounted on a vehicular object, with there being reflection points whose relative-velocity components along the line of radar sight and whose azimuthal angles are detected by said radar device, the off-axis angle estimation apparatus, comprising:

a reflection point selection means for selecting a plurality of detected reflection points whose relative-velocity components in the traveling direction of the vehicular object are approximately equal; and an off-axis angle calculation means for calculating the off-axis angle based on the relative-velocity components along the line of radar sight and the azimuthal angles of the plurality of selected reflection points, wherein:

the reflection-point selection means, at a first time-interval and a second time-interval both predetermined for a time duration, selects a plurality of reflection points from among the reflection points detected by the radar device having the relative-velocity components and azimuthal angles so that the relative-velocity components in the traveling direction of the vehicular object are approximately equal to one another;

the off-axis angle calculation means, based on the relative-velocity components along the line of radar sight and on the azimuthal angles of the plurality of reflection points selected by said reflection-point selection means, calculates an off-axis angle for the first time-interval and an off-axis angle of the second time-interval; and, the apparatus further comprises an off-axis angle true-value estimation means for estimating a true value of the off-axis angle based on the off-axis angle calculated for the first time-interval and the off-axis angle calculated for the second time-interval.

5. An off-axis angle estimation apparatus for estimating an off-axis angle of a radar device mounted on a vehicular object, comprising:

an off-axis angle calculation means for calculating off-axis angles based on the relative-velocity components along the line of radar sight, and on azimuthal angles, of reflection points detected by said radar device;

a reflection-point selection means for selecting a plurality of the reflection points whose relative-velocity components in the traveling direction of the vehicular object are approximately equal, wherein the reflection points used for calculating the off-axis angles are selected such that an off-axis angle calculated by said off-axis angle calculation means is included within a predetermined range of values; and an off-axis angle true-value estimation means for estimating a true value of the off-axis angle of said radar device from the off-axis angles calculated by the off-axis angle calculation means.

* * * * *